(12) United States Patent
Liu et al.

(10) Patent No.: US 10,490,210 B1
(45) Date of Patent: Nov. 26, 2019

(54) OPTIMIZATION OF HIGH DAMPING SHIELD GEOMETRY IN PERPENDICULAR MAGNETIC RECORDING (PMR) WRITER

(71) Applicant: Headway Technologies, Inc., Milpitas, CA (US)

(72) Inventors: Ying Liu, San Jose, CA (US); Yue Liu, Fremont, CA (US); Kei Hirata, Sunnyvale, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/250,680

(22) Filed: Jan. 17, 2019

(51) Int. Cl.
| *G11B 5/127* | (2006.01) |
| *G11B 5/187* | (2006.01) |
| *G11B 5/60* | (2006.01) |
| *G11B 5/11* | (2006.01) |

(52) U.S. Cl.
CPC .............. *G11B 5/1278* (2013.01); *G11B 5/11* (2013.01); *G11B 5/187* (2013.01); *G11B 5/6082* (2013.01)

(58) Field of Classification Search
CPC ....... G11B 5/112; G11B 5/1278; G11B 5/187; G11B 5/235; G11B 5/3169; G11B 5/313; G11B 5/315; G11B 5/3143; G11B 5/3116
See application file for complete search history.

(56) References Cited

U.S. PATENT DOCUMENTS

| 6,353,511 | B1 | 3/2002 | Shi et al. |
| 7,113,367 | B2 | 9/2006 | Yazawa et al. |
| 7,268,974 | B2 | 9/2007 | Lille |
| 7,952,831 | B2 | 5/2011 | Kim et al. |
| 8,089,723 | B2 | 1/2012 | Schabes |
| 8,111,479 | B2 | 2/2012 | Chen et al. |
| 8,284,516 | B1 | 10/2012 | Tang et al. |
| 8,427,781 | B1 | 4/2013 | Sasaki et al. |
| 8,462,461 | B2 | 6/2013 | Braganca et al. |
| 8,498,079 | B1 * | 7/2013 | Song ................... G11B 5/1278 360/125.3 |

(Continued)

OTHER PUBLICATIONS

"Effect of 3d, 4d, and 5d transition metal doping on damping in permalloy thin films," by J. O. Rantschler et al., Journal of Applied Physics 101, 033911, Feb. 14, 2007, pp. 1-5.

(Continued)

*Primary Examiner* — Brian E Miller

(74) *Attorney, Agent, or Firm* — Saile Ackerman LLC; Stephen B. Ackerman

(57) ABSTRACT

A PMR writer is disclosed with a leading shield in which a lower (LS2) layer, a middle LS1 layer, and an upper leading edge taper (LET) layer have a damping parameter≥0.04, and extend from an air bearing surface (ABS) to a first height (h1) from the ABS. The LS2 layer has a notch filled with dielectric material at the air bearing surface (ABS) that extends to a height≤h1, or may be completely replaced with dielectric material. Two notch front sides each form an angle β with the LS1 bottom surface, and two notch inner sides between the ABS and LS2 backside form angle δ with the ABS where each of β and δ is from 10 degrees to 170 degrees. Accordingly, bits per square inch performance is improved while substantially maintaining tracks per square inch capability for an overall gain in area density capability.

29 Claims, 12 Drawing Sheets

(56) References Cited

U.S. PATENT DOCUMENTS

| | | |
|---|---|---|
| 8,542,461 B2 | 9/2013 | Bai et al. |
| 8,582,238 B1 | 11/2013 | Liu et al. |
| 8,749,919 B2 | 6/2014 | Sasaki et al. |
| 8,879,208 B1 | 11/2014 | Liu et al. |
| 9,082,433 B1 | 7/2015 | Tang et al. |
| 9,361,912 B1 | 6/2016 | Liu et al. |
| 9,466,319 B1* | 10/2016 | Tang ............... G11B 5/1278 |
| 9,508,364 B1* | 11/2016 | Tang ............... G11B 5/112 |
| 9,653,101 B1* | 5/2017 | Liu ............... G11B 5/3116 |
| 9,721,604 B2* | 8/2017 | Tang ............... G11B 5/3116 |
| 9,754,612 B2 | 9/2017 | Wei et al. |
| 10,014,021 B1* | 7/2018 | Liu ............... G11B 5/1278 |
| 10,032,469 B2 | 7/2018 | Lim et al. |
| 10,102,871 B1* | 10/2018 | Basu ............... G11B 5/1871 |
| 10,109,304 B1* | 10/2018 | Liu ............... G11B 5/3163 |
| 10,229,703 B2* | 3/2019 | Liu ............... G11B 5/112 |
| 2007/0171575 A1 | 7/2007 | Lim et al. |
| 2012/0050921 A1 | 3/2012 | Marshall |
| 2013/0027809 A1 | 1/2013 | Min et al. |
| 2013/0155544 A1* | 6/2013 | Hamasaki ............ G11B 5/1278 360/75 |
| 2013/0335847 A1 | 12/2013 | Shiroishi |
| 2018/0144768 A1* | 5/2018 | Liu ............... G11B 5/3116 |
| 2018/0330748 A1* | 11/2018 | Liu ............... G11B 5/112 |

OTHER PUBLICATIONS

"Micromagnetic Analysis of Adjacent Track Erasure of Wrapped-Around Shielded PMR Writers," by Suping Song et al., IEEE Transactions on Magnetics, vol. 45, No. 10, Oct. 2009, pp. 3730-3732.

"Characterization of Adjacent Track Erasure in Perpendicular Recording by a Stationary Footprint Technique," by Yuhui Tang et al., IEEE Transactions on Magnetics, vol. 49, No. 2, Feb. 2013, pp. 744-750.

"Magnetic Damping in Ferromagnetic Thin Films," by Mikihiko Oogane et al., Japanese Journal of Applied Physics, vol. 45, No. 5A, May 9, 2006, pp. 3889-3891.

* cited by examiner

OPTIMIZATION OF HIGH DAMPING SHIELD GEOMETRY IN PERPENDICULAR MAGNETIC RECORDING (PMR) WRITER

RELATED PATENT APPLICATIONS

This application is related to the following: U.S. Pat. Nos. 9,466,319; 10,014,021; Ser. No. 15/595,357, filing date May 15, 2017; assigned to a common assignee and herein incorporated by reference in their entirety.

TECHNICAL FIELD

The present disclosure relates to a leading shield (LS) structure in a PMR write head wherein a notch is formed in a lower (LS2) layer of the LS that is a greater distance from the leading gap than the uppermost leading edge taper (LET), and a middle (LS1) layer, and where the LS1 and LS2 layers are made of a high damping material, which provide an enhanced trailing shield return field to improve bits per inch (BPI) with minimal tradeoff in tracks per inch (TPI) capability for an overall result of greater area density capability (ADC).

BACKGROUND

Perpendicular magnetic recording has been developed in part to achieve higher recording density than is realized with longitudinal recording devices. A PMR write head typically has a main pole layer with a small surface area at an air bearing surface (ABS), and coils that conduct a current and generate a magnetic flux in the main pole such that the magnetic flux exits through a write pole tip and enters a magnetic medium (disk) adjacent to the ABS. Magnetic flux is used to write a selected number of bits in the magnetic medium and typically returns to the main pole through two pathways including a trailing loop and a leading loop where both involve a shield structure. The trailing loop comprises a trailing shield structure with first and second trailing shields each having a front side at the ABS. The leading loop includes a leading shield with a front side at the ABS and connected to a return path proximate to the ABS. The return path extends to the back gap connection and enables magnetic flux in the leading loop pathway to return from the leading shield through the back gap connection to the main pole layer.

For both conventional (CMR) and shingle (SMR) magnetic recording, continuous improvement in storage area density is required for a PMR writer. A write head that can deliver or pack higher BPI and higher TPI is essential to ADC improvement. A fully wrapped around shield design for a PMR write head is desired where the trailing shield is responsible for improving down track field gradient while side shields and a leading shield enhance the cross track field gradient and TPI as well as improve adjacent track erasure (ATE) also known as ATI.

The key to an optimized PMR writer structure is the capability to control distribution of magnetic flux from the main pole to each shield. Ideally, better control of magnetic flux in the near field or proximate to the main pole is desirable to achieve an enhanced near field gradient and to realize higher ADC. Typically, flux distribution is controlled by changing the magnetic saturation (Ms) of materials in the shields, and by modifying geometries (size and shape) of the shields. In today's PMR design, most shield optimization efforts have focused on the side shields and trailing shield, and substantially less emphasis on the leading shield. However, in order to achieve higher performance capability associated with PMR writers that require higher TPI capability to at least 400K/in$^2$ for CMR and at least 500K/in$^2$ for SMR, a better design is needed for the leading shield structure.

SUMMARY

One objective of the present disclosure is to provide leading shield design for a PMR writer that enables a means of improving BPI and kilo flux change per inch (kFCI) while substantially maintaining ATI and TPI.

Another objective of the present disclosure is to provide a method of forming the leading shield of the first objective that is readily implemented in a manufacturing environment.

According to a first embodiment, these objectives are achieved with a PMR writer that has an all wrap around (AWA) shield structure wherein a trailing shield, side shields, and a patterned leading shield surround a main pole at the ABS, and adjoin a write gap, side gap, and leading gap, respectively. However, the patterned leading shield is not limited to an AWA shield structure in order to deliver improved PMR writer performance as described herein. In one embodiment, the main pole (MP) has a tapered leading side that adjoins the leading gap and extends from the ABS to a back end at a first corner where the tapered leading side intersects with a front end of a MP leading side formed orthogonal to the ABS. Likewise, the MP may have a tapered trailing side that adjoins the write gap and extends from the ABS to a second corner where the tapered trailing side intersects with a MP trailing side formed orthogonal to the ABS.

In all embodiments, the leading shield (LS) structure features a leading edge taper (LET) layer adjoining the leading gap, a middle portion hereinafter called the LS1 layer, and a patterned bottom portion hereinafter referred to as the LS2 layer. Each of the LET, LS1, and LS2 layers has a front side at the ABS and has a magnetization saturation (Ms) value from 1 kiloGauss (kG) to 19 kG. According to a first embodiment, the LS1 and LS2 layers each extend to a backside at a first height from the ABS. The LET layer has a tapered top surface, and LET thickness decreases with increasing distance from the ABS until reaching essentially 0 nm at the first height. A key feature is a notch formed in the LS2 layer that has a cross-track width w, and a height that is from 50 nm to 1 micron. The notch is filled with a dielectric layer and is bisected by a center plane that also bisects the leading and trailing edges of the MP tip at the ABS. The notch has a backside at the first height (h1) and completely separates a first portion of the LS2 layer from a second portion of the LS2 layer that are on opposite sides of the center plane. Preferably, each of the LET, LS1 and LS2 layers are a high damping (HD) material with a damping parameter α>0.04. In a second embodiment, the LS2 layer is completely replaced by a dielectric material. According to a third embodiment, the notch has a height<h1 and is formed only in a front portion of the LS2 layer proximate to the ABS while a back portion of the LS2 layer has a full width between the sides of the LS.

Accordingly, the preservation of LS1 volume compared with conventional leading shield designs is responsible for preventing SS saturation to substantially maintain TPI and ATI. Meanwhile, LS2 volume reduction proximate to the center plane at track center, or replacing the LS2 layer with dielectric material across the full width of the LS, advantageously releases a portion of the MP return field from the leading loop to the trailing loop thereby boosting BPI.

In a preferred embodiment, the cross-track width w of the notch is at least 1 micron, but does not extend the full width of the leading shield in order to avoid a complete break in the leading loop for magnetic flux return from the magnetic medium to the MP.

A method for forming the patterned side shield is also provided and includes forming a notch filled with a dielectric material in the LS2 layer, and depositing middle (LS1) and upper (LET) portions of the leading shield on the patterned LS2 layer. Then a conventional photoresist patterning and etching sequence is performed to form a tapered top surface on the LET layer, and a backside on the LS1 and LS2 layers at the first height. Thereafter, conventional processes are employed to form an insulation layer adjoining the LS1 and LS2 backsides, and a leading gap on the LET layer.

DETAILED DESCRIPTION

Figure 1:
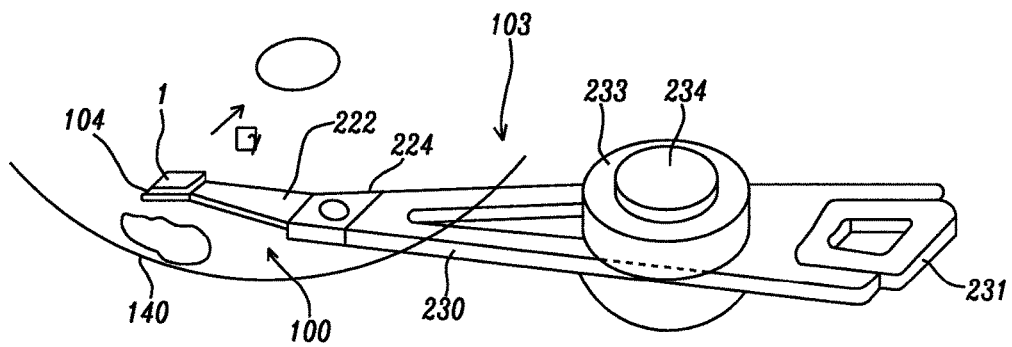
FIG. 1 is a perspective view of a head arm assembly of the present disclosure.

The present disclosure relates to a leading shield design where a lower portion of the leading shield (LS2 layer) is patterned, or entirely replaced with dielectric material, to release a portion of the magnetic flux return in the leading loop to the trailing loop to boost BPI while substantially maintaining TPI and ATI for a net ADC gain. The exemplary embodiments depict a main pole with a tapered leading side and tapered trailing side. However, the present disclosure also anticipates that one or both of the main pole leading side and trailing side proximate to the ABS are not tapered but are formed along a plane that is orthogonal to the ABS. In the drawings, the y-axis is a cross-track direction, the z-axis is a down-track direction, and the x-axis is in a direction orthogonal to the ABS and towards a back end of the PMR writer. Thickness refers to a down-track distance, width is a cross-track distance, and height is a distance in a direction orthogonal to the ABS. It should be understood that the PMR writer described herein is not limited to a particular coil design, or to a particular leading loop or trailing loop for magnetic flux return from a magnetic medium to the MP. A backside of a layer is intended to mean a side of a layer that faces away from the ABS while a top surface or bottom surface is formed in a (x, y) plane in the embodiments described herein.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
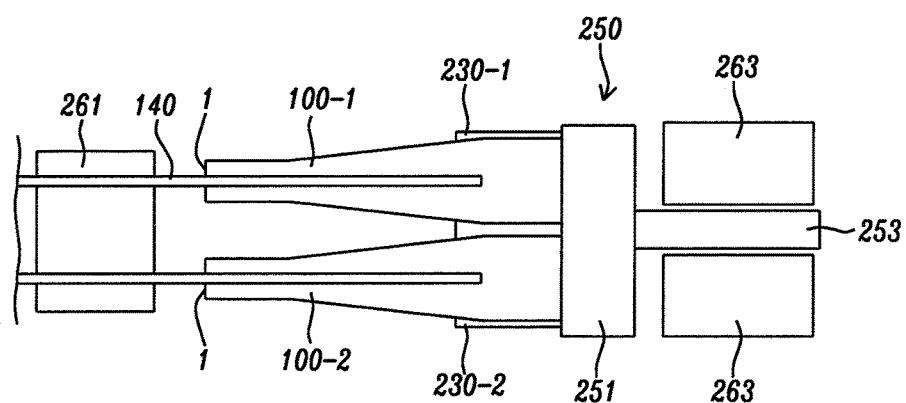
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
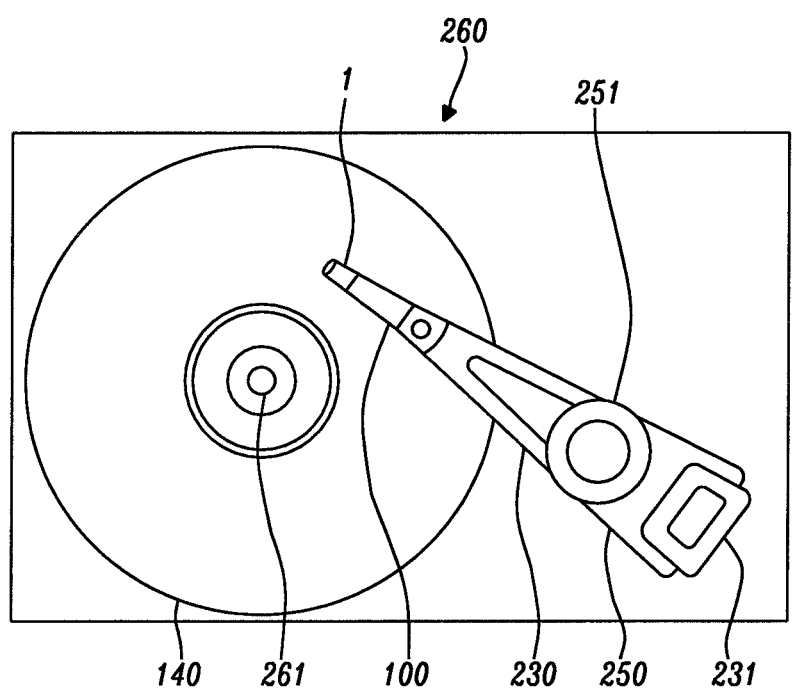
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
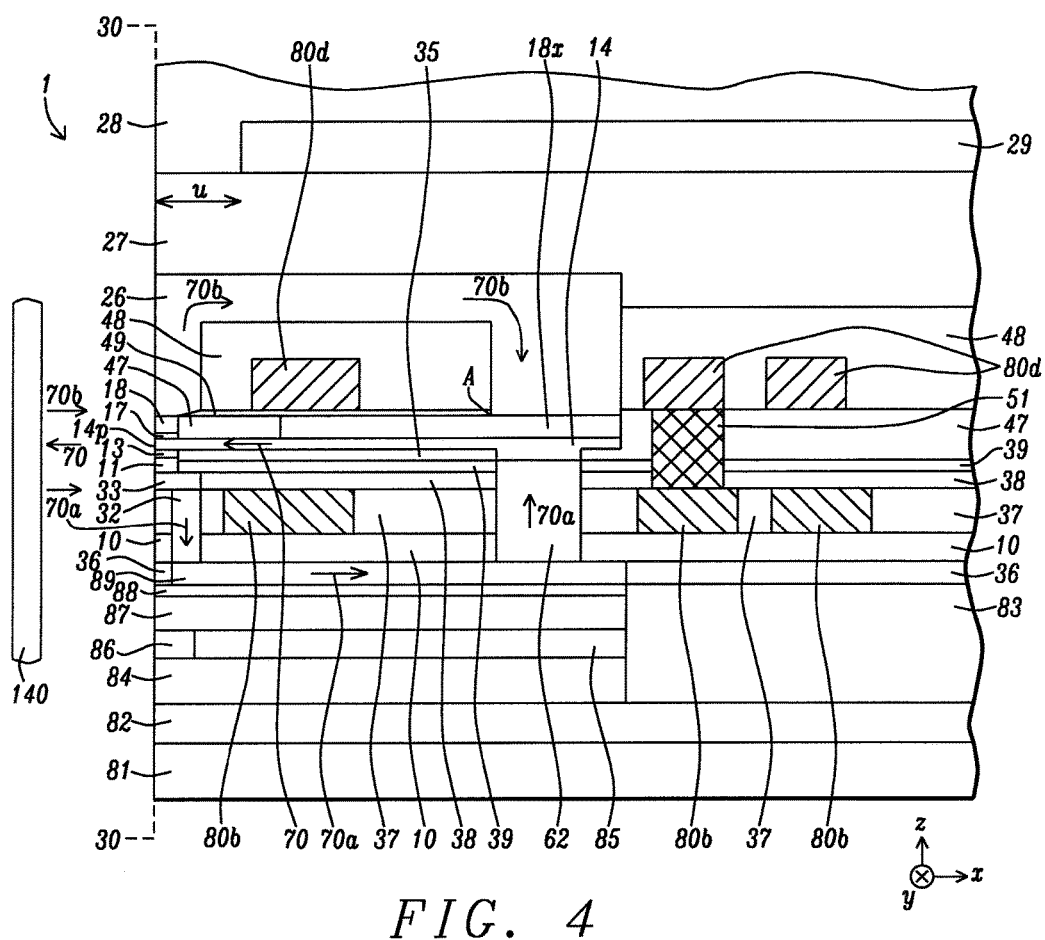
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (44-44 in FIG. 5A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer may serve as a flux return path (RTP) in the write head portion of the combined read/write head. Thus, the portion of the combined read/write head structure formed below S2B layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, PP3 shield 26, and top yoke 18x. There is also a leading return loop for magnetic flux 70a that includes leading shield 11, leading shield connector (LSC) 33, S2C 32, return path (RTP) 89, and back gap connection (BGC) 62. The magnetic core may also comprise a bottom yoke 35 below the main pole layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5A:
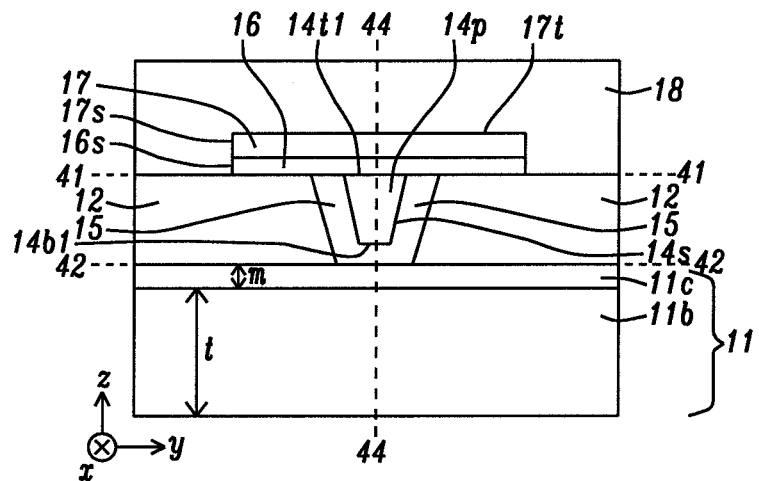
FIGS. 5A-5C are an ABS view, down-track cross-sectional view, and top-down view, respectively, that show an AWA shield structure with a conventional leading shield design.

Referring to FIG. 5A, an ABS view is depicted of an AWA shield structure known to the inventors, and hereinafter referred to as the POR shield structure, that surrounds the MP tip 14p in the PMR writer in FIG. 4. Leading shield 11 has a LET layer 11c formed on LS1 layer 11b, a bottom surface of side shields 12 contacting the LET layer at plane 42-42, and a top surface of the side shields adjoining second trailing shield 18 at plane 41-41 that also comprises an edge of MP trailing side 14t1. The LS1 layer has thickness t and the LET layer has a thickness m at the ABS. The trailing shield structure comprises a first trailing shield 17 typically having a high Ms of 19-24 kG formed on write gap 16. Center plane 44-44 bisects MP trailing side 14t1 and MP leading side 14b1 on MP tip 14p, and is orthogonal to planes 41-41 and 42-42. A side gap 15 is formed between each MP side 14s and a side shield. Leading gap 13 is between MP leading side 14b1 and plane 42-42, and the write gap is between plane 41-41 and the first trailing shield (TS). A first TS side 17s and write gap side 16s are preferably coplanar. Second TS layer 18 adjoins the first TS sides 17s and first TS top surface 17t.

Figure 5B:
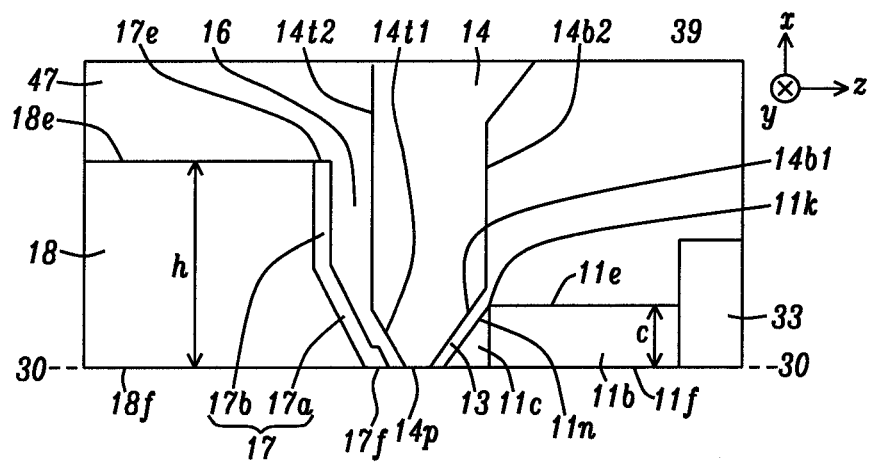

In FIG. 5B, the MP and POR shield structure from FIG. 5A are depicted in a down-track cross-sectional view at center plane 44-44. LET layer 11c has a top surface 11n that is tapered and separated from MP tapered leading side 14b1 by leading gap 13. The remainder of the leading shield is comprised of LS1 layer 11b that extends in a down-track direction from the LET layer to LSC 33. LS1 (and LET) front side 11f is at the ABS 30-30 while LS1 backside 11e is at height c from the ABS. The LET tapered top surface connects to the LS1 backside at corner 11k at height c. MP bottom surface 14b2 is orthogonal to the ABS and adjoins insulation layer 39. MP 14 also has a top surface 14t2 that is parallel to the MP bottom surface, and connected to MP tapered trailing side 14t1, which is separated from the trailing shield structure by write gap 16. First TS 17 typically has a front portion 17a having a front side 17f at the ABS and aligned substantially parallel to the MP tapered trailing side, and a back portion 17b with a backside 17e. Second TS layer 18 has a front side 18f at the ABS, and may have a backside 18e at the same height h as backside 17e where backside 18e adjoins insulation layer 47.

Figure 5C:
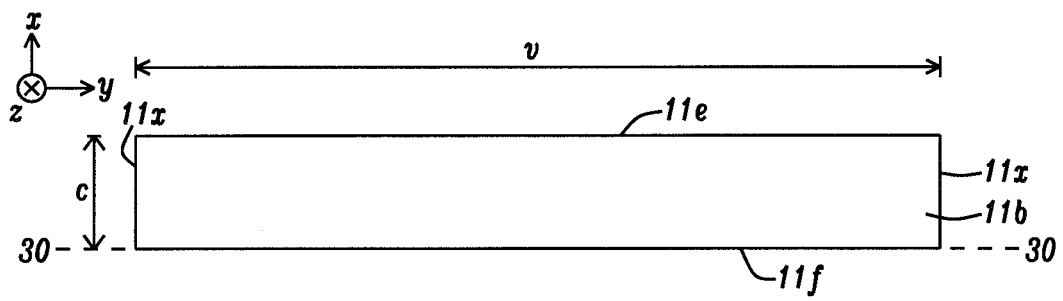

In FIG. 5C, LS1 layer 11b in FIG. 5A is pictured from a top down (down-track) perspective from main pole tapered leading side 14b1 and with leading gap 13 and LET layer 11c removed. The leading shield backside 11e is at height c from the ABS 30-30, and has a cross-track width v between far sides 11x. Note that the LS1 layer has a rectangular shape with no openings in any portion thereof.

In related patent application Ser. No. 15/595,357, we disclosed how greater area density capability (ADC) and a boost in overwrite (OW) and bit error rate (BER) performance is achieved by forming a notch in a backside of the LET layer at the center track position. This concept was expanded in U.S. Pat. No. 10,014,021 to further include a notch in backside of a top portion of the LS1 layer where the notch is recessed from the ABS and bisected by a center plane to provide a net ADC gain. Now, we have discovered that a bottom portion (LS2 layer) of the leading shield may be patterned to include a notch that enhances BPI and ADC by releasing a substantial amount of magnetic flux return from the leading loop to the return loop via the trailing shield structure.

Figure 6A:
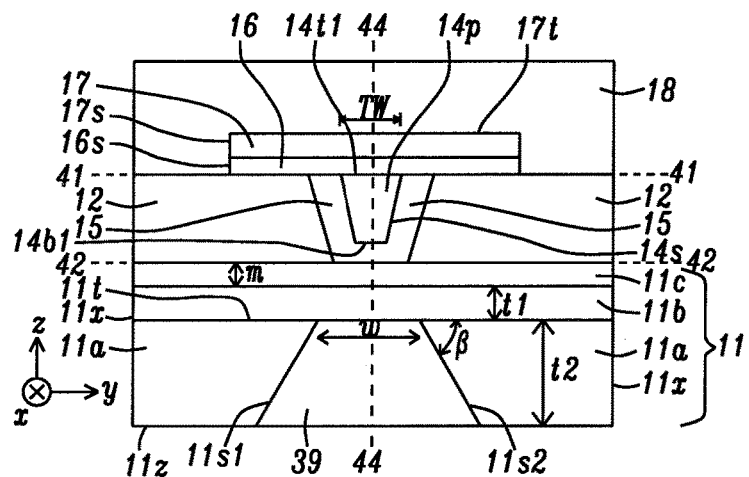
FIGS. 6A-6C are an ABS view, down-track cross-sectional view, and top-down view, respectively, that show an AWA shield structure with a patterned leading shield design according to a first embodiment of the present disclosure.
Figure 6B:
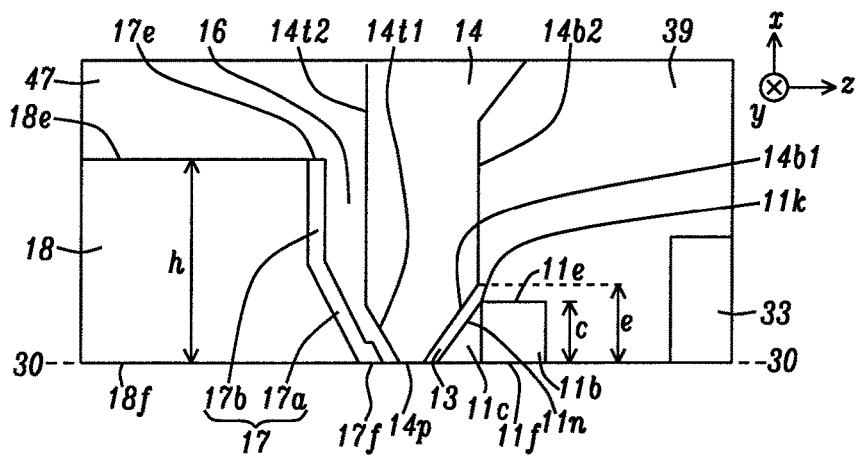
Figure 6C:
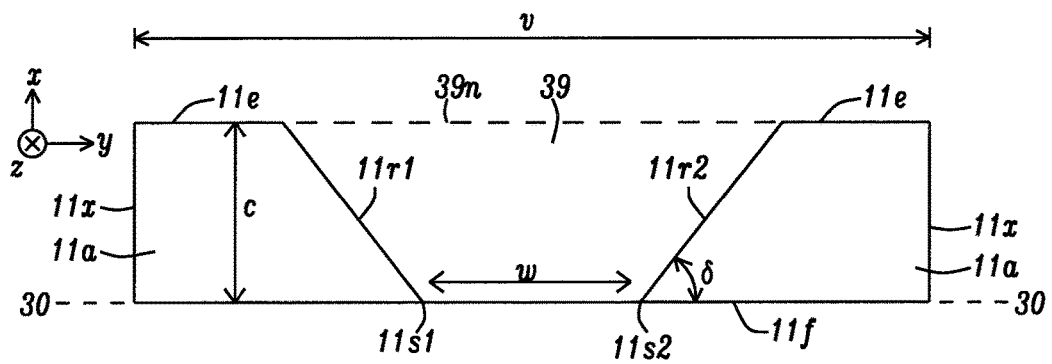

A first embodiment of the present disclosure is depicted in FIGS. 6A-6C. In FIG. 6A, an ABS view is provided of an AWA shield structure that retains all the features of the MP and shield structure shown in FIG. 5A except the leading shield 11 now has a third leading shield portion referred to as LS2 layer 11a with thickness t2 from 300 nm to 950 nm. The LS2 layer is formed below the LS1 layer 11b that has thickness t1 from 50 nm to 700 nm. Preferably, t1+t2=thickness t in FIG. 5A. LET layer 11c, the LS1 layer, LS2 layer, side shields 12, and second TS 18 are typically comprised of a 1 kG to 19 kG magnetic material. The side shields, first TS 17, second TS, and MP 14 typically have a composition that is CoFe, CoFeNi, FeNi, or CoFeN. The first TS and MP including MP tip 14p preferably have a Ms in the range of 19 kG to 24 kG. MP tapered trailing side 14t1 has track width TW at the ABS. Preferably, each of the LET, LS1, and LS2 layers is a high damping (HD) material with a damping parameter α of ≥0.04 that is higher than in the POR shield structure wherein shield layers have a damping parameter α around 0.02. Previously, we disclosed the use of a HD material in a leading shield in related U.S. Pat. No. 9,466,319 in order to minimize wide adjacent track erasure while maintaining ADC. The LET layer has a thickness m from 2 nm to 500 nm at the ABS.

A key feature of the leading shield design of the first embodiment of the present disclosure is that the LS2 layer 11a comprises a notch (opening) that is bisected by center plane 44-44, is filled with dielectric layer 39, and extends from a bottom surface 11t of LS1 layer 11b to a bottom surface 11z of the LS2 layer. The notch has a first side 11s1 on a first side of the center plane, and a second side 11s2 on an opposite side of the center plane where each side forms an angle β with LS1 bottom surface 11t, and where β is from 10 degrees to 170 degrees. The notch width w at the LS1 bottom surface has a minimum value of 200 nm and may have a maximum value equivalent to the entire distance between far sides 11x. As explained later, w is preferably at least 1 micron and has a maximum value of around 14 microns. Preferably, w is less than the entire distance between far sides 11x (less than v in FIG. 6C) in order to prevent a complete break in the leading loop for magnetic flux return described earlier. Thus, the LS2 layer has a first portion formed between notch side 11s1 and far side 11x on one side of the center plane, and a second portion formed between notch side 11s2 and far side 11x on a second side of the center plane.

According to a preferred embodiment, each of LS2 layer 11a, LS1 layer 11b, and LET 11c is a HD material with a damping parameter α≥0.04 that is an alloy such as FeNiM, FeCoM, or FeCoNiM where M is a 3d, 4d, or 5d transition metal that is one of Re, Os, Ir, Rh, Ti, Ta, V, Cr, W, Mn, Mo, Cu, Zr, Nb, Hf, Ru, Pd, Pt, Ag, and Au as disclosed in related U.S. Pat. No. 9,466,319. Accordingly, the advantage of the first embodiment compared with the POR shield structure and prior art is that the LS1 layer volume is sufficient to prevent the side shields from becoming saturated thereby substantially maintaining TPI and ATI while magnetic volume reduction in the LS2 layer at track center (center plane 44-44) due to the notch, and optionally across the full width of the LS as found in the second embodiment, causes a release of MP return field from the leading loop to the trailing loop, which enhances BPI and ADC.

Figure 7:
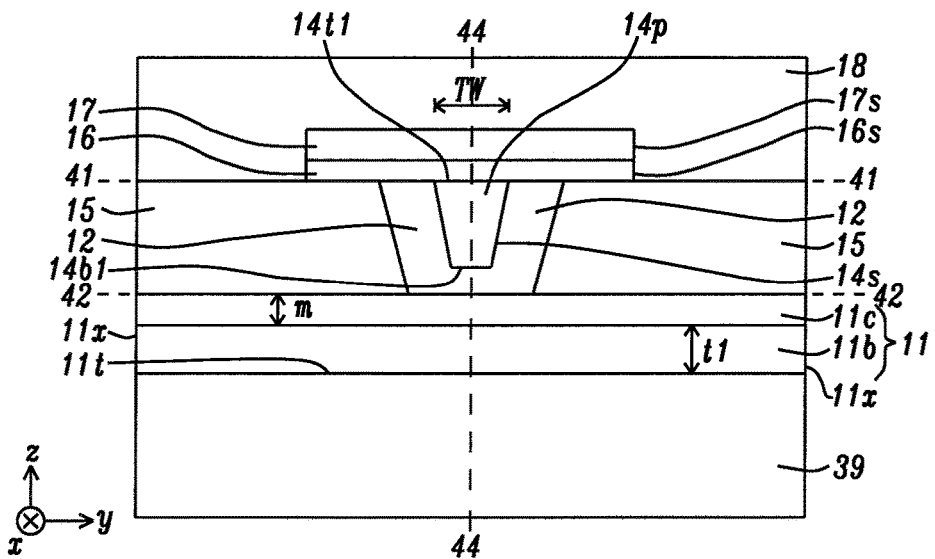
FIG. 7 is an ABS view that shows an AWA shield structure wherein a LS2 layer in the first embodiment is replaced with a dielectric layer to provide a dielectric gap in the leading loop for magnetic flux return to the MP from a magnetic medium.

FIG. 7 depicts an ABS view of the second embodiment of the present disclosure wherein the entire LS2 layer from the first embodiment is replaced with dielectric layer 39 having the thickness t2 of 300 nm to 950 nm between far sides 11x. Accordingly, the LS now comprises only LET layer 11c and LS1 layer 11b. The down-track cross-sectional view at center plane 44-44 is shown in FIG. 6B and is the same view provided by the first embodiment where there is a notch in the LS2 layer 11a at the center plane.

Referring to FIG. 6B, a down-track cross-sectional view is shown at plane 44-44 in FIG. 6A (or FIG. 7) and retains all the features of FIG. 5B except there is a dielectric gap between LS1 layer 11b and LSC 33 that corresponds to the notch comprised of dielectric layer 39 formed within the LS2 layer in FIG. 6A (or only dielectric layer 39 in FIG. 7). In other words, LS1 layer backside 11e does not continue to LSC 33 as in the POR shield structure, but is interrupted by dielectric layer 39. LS1 layer has a front side 11f at the ABS 30-30.

Referring again to the first embodiment, the first and second portions of LS2 layer (not shown) adjoining the notch also share front side 11f with LET layer 11c and the LS1 layer. Note that the corner 11k where LET top surface 11n meets the LS1 backside (at height c from the ABS 30-30) is proximate to MP corner 14c where the MP tapered leading side 14b1 connects with the MP bottom surface 14b2 at height e. In the exemplary embodiment, c<e. However, in other embodiments (not shown), e may be ≤c.

In FIG. 6C, a top-down view from the MP tapered leading side in FIG. 6B (first embodiment) is shown with the leading gap 13, LET layer 11c, and LS1 layer 11b removed in order to illustrate a substantially rectangular shape for LS2 layer 11a that is bounded in the cross-track direction by far sides 11x, and has a front side 11f at the ABS 30-30. The LS2 layer has a backside 11e interrupted by the notch that is filled with dielectric layer 39 between a first inner side 11r1 and a second inner side 11r2 formed on opposite sides of center plane 44-44. Inner side 11r1 extends from notch side 11s1 at the ABS to backside 11e on a first side of the center plane, and inner side 11r2 extends from notch side 11s2 at the ABS to backside 11e on a second side of the center plane. Each inner side forms an angle δ with front side 11f where δ is from 10 degrees to 170 degrees. It should be understood that δ may differ from β described previously. For example, ρ may be 90 degrees while δ is substantially less than 90 degrees as in the exemplary embodiment in FIG. 6C. When δ<90 degrees, notch backside 39n has a greater width than w. Preferably, height c between the ABS and backside 11e is from 50 nm to 1 micron.

Figure 8A:
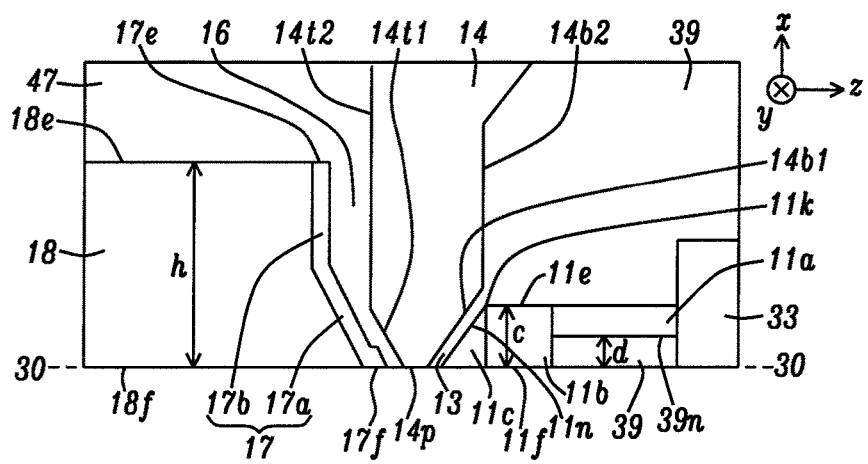
FIG. 8A shows a down-track cross-sectional view.

Referring to FIG. 8A, a third embodiment of the present disclosure is shown from a down-track cross-sectional view at plane 44-44 in FIG. 6A, and is a modification of the first embodiment. In particular, all features in FIG. 6B are retained except the notch size is reduced with the continuation of backside 11e from LS1 layer 11b to LSC 33. Thus, a back portion of LS2 layer 11a at the center plane is formed between a notch backside 39n and LS2 backside 11e. Dielectric layer 39 fills the notch that extends in a down-track direction from LS1 layer 11b to LSC 33, and is bounded on the front and backsides by ABS 30-30 and LS2 layer 11a, respectively. The notch height d is less than c but d>0 nm in the third embodiment. Although the boost in BPI will be diminished somewhat with a smaller notch size, there will be less tradeoff in TPI and ATI in the third embodiment compared with the first embodiment.

Figure 8B:
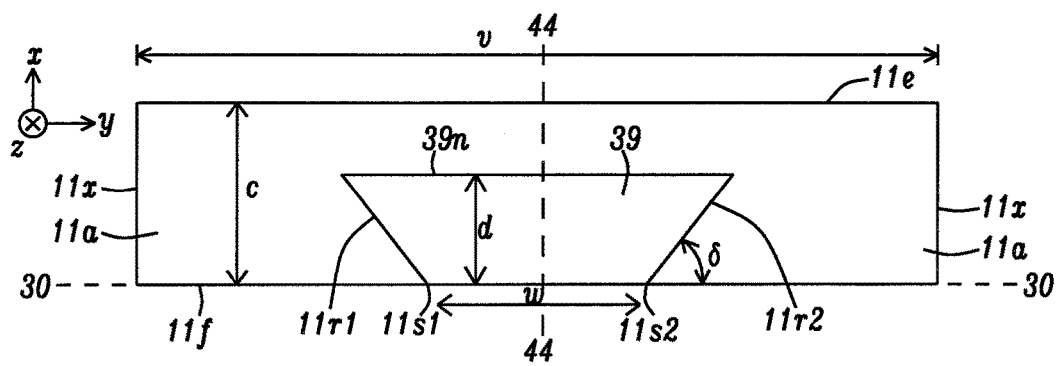
FIG. 8B depicts a top-down view of an AWA shield structure with a patterned leading shield design according to a third embodiment of the present disclosure.

FIG. 8B shows a top-down view from the MP tapered leading side in FIG. 8A with the leading gap 13, LET layer 11c, and LS1 layer 11b removed in order to reveal a rectangular shape for LS2 layer 11a that is bounded in the cross-track direction by far sides 11x, and has a front side 11f at the ABS 30-30, and a continuous backside 11e between the far sides. Again, the notch is filled with dielectric layer 39 between a first inner side 11r1 and a second inner side 11r2 that are formed on opposite sides of center plane 44-44. Inner side 11r1 extends from notch side 11s1 at the ABS to backside 39n on a first side of the center plane, and inner side 11r2 extends from notch side 11s2 at the ABS to the backside 39n on a second side of the center plane. Each inner side forms an angle δ with front side 11f where δ is from 10 degrees to 170 degrees. When δ is 90 degrees, the notch has a rectangular shape. Otherwise, the notch has a trapezoid shape where the front side having width w at the ABS is unequal to a width of backside 39n. As in the first embodiment, δ may be unequal to β.

In order to demonstrate the advantages of the second embodiment of the present disclosure, a finite element (FEM) simulation was performed to compare the POR leading shield example with that of the leading shield design shown in FIG. 7 and FIG. 6B. In the POR leading shield, t=700 nm while the second embodiment example has LS1 t1=200 nm, and LS thickness reduction resulting from replacing an entire LS2 layer with dielectric material is t2=500 nm. Since cross-track width w is set equal to v that is 14 microns, angles β and δ are not applicable in this simulation where the entire LS2 layer is replaced with a dielectric layer. Height c=150 nm for both of the POR and second embodiment examples.

Figure 9:
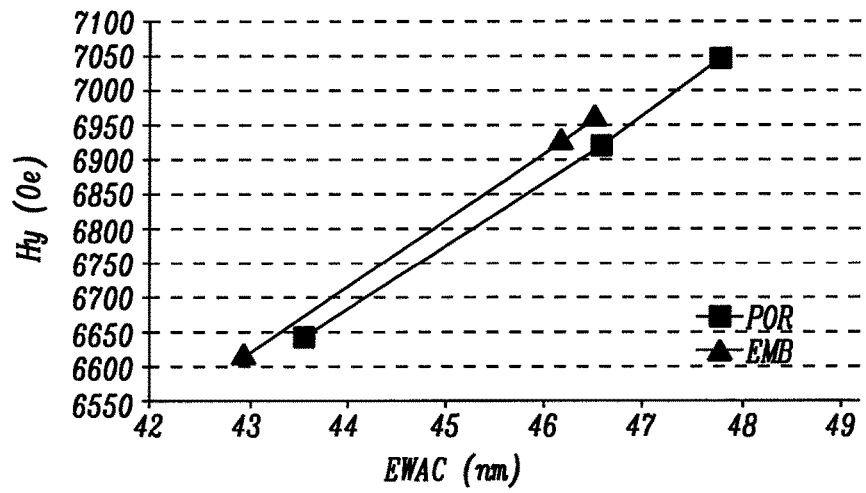
FIG. 9 is a graph showing the results of Hy field vs. erase width in an AC field mode (EWAC) for a PMR writer having a conventional leading shield, and with a patterned leading shield according to an embodiment of the present disclosure.
Figure 10:
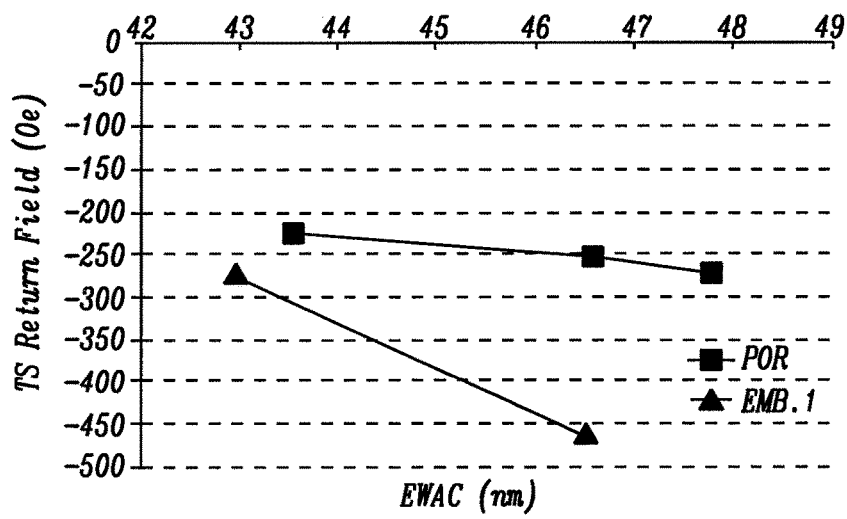
FIG. 10 is a graph showing the results of TS return field vs. EWAC for a PMR writer having a conventional leading shield, and with a patterned leading shield according to an embodiment of the present disclosure.
Figure 11:
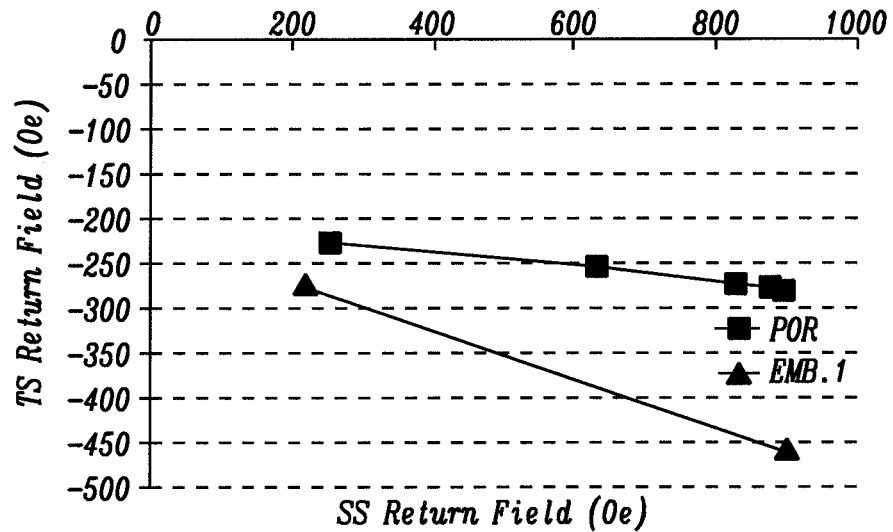
FIG. 11 is a graph that illustrates TS return field as a function of SS return field for a PMR writer with a conventional leading shield, a PMR writer with a patterned leading shield according to an embodiment of the present disclosure.

Referring to FIG. 9, Hy field on the recording media is plotted vs. erase width in AC mode (EWAC) for a PMR writer with the POR leading shield, and for the leading shield of the second embodiment. FIG. 10 shows a plot of TS return field vs. EWAC for the POR and second embodiment designs. Results indicate that under the same EWAC, the writer of the second embodiment shows a stronger write field, and substantially greater TS return field than the POR shield structure. In FIG. 11 where TS return field is plotted vs. side shield (SS) return field, the second embodiment design enables a significant TS response (BPI) gain with negligible SS saturation loss. Accordingly, the simulation results indicate a PMR writer with a patterned leading shield of the present disclosure will provide a net ADC gain in view of an increase in BPI while substantially maintaining TPI compared with the POR scheme.

Figure 12:
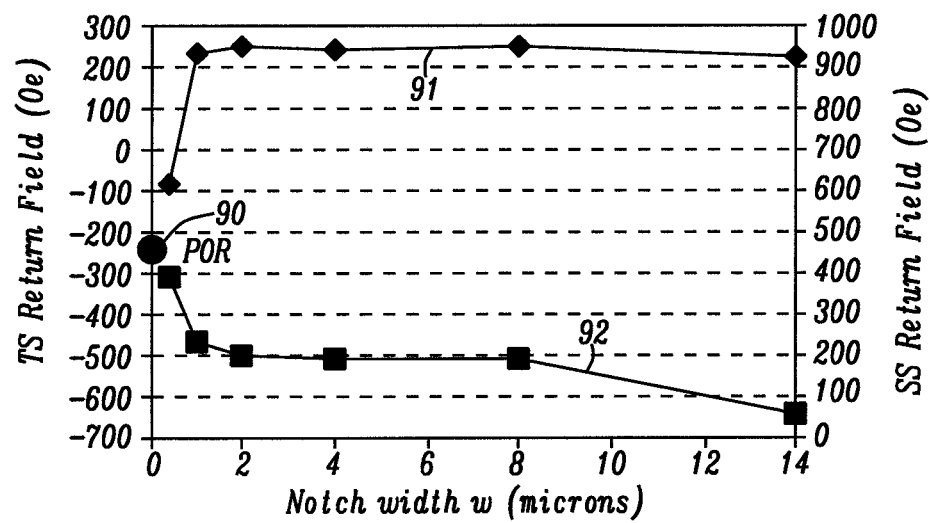
FIG. 12 is a graph showing TS and SS return fields as a function of the cross-track width of the notch in the patterned leading shield of the present disclosure.

A second FEM simulation was performed and results are shown in FIG. 12 where SS return field (curve 91) and TS return field (curve 92) are plotted as a function of notch width w that has a maximum value of 14 microns according to the first embodiment. Note that although replacing the entire LS2 volume as in the first FEM simulation provides ADC gain, writer speed may be penalized since the leading loop for magnetic flux return to the MP is disconnected. Thus, we studied various notch widths in order to optimize writer speed while substantially maintaining ADC gain. In this simulation, LS2 height c=150 nm while LS2 t2=500 nm, and LS1 t1=200 nm. POR performance is represented by point 90 where w=0 (no notch). We find that when w is ≥1 micron according to the first embodiment of the present disclosure, the desired objective of simultaneously optimizing writer speed and ADC is achieved.

The present disclosure also encompasses a method of forming a PMR writer having a patterned leading shield design according to the first embodiment. Only the process steps associated with leading shield formation are described in detail. The remainder of the PMR writer fabrication sequence comprises conventional steps that are well known in the art and are not described herein.

Figure 13:
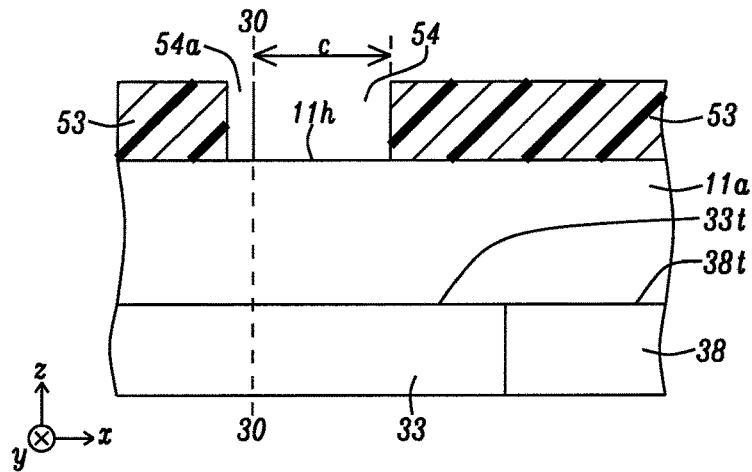
FIGS. 13, 15, and 17-22 are down-track cross-sectional views.

Referring to FIG. 13, a down-track cross-sectional perspective is depicted at center plane 44-44 and shows plane 30-30 (the eventual ABS location). A substrate is provided comprised of uppermost layers LSC 33 (intersected by plane 30-30) and insulation layer 38 that have coplanar top surfaces 33t and 38t, respectively. LS2 layer 11a is deposited on top surfaces 33t, 38t. Next, a photoresist layer 53 is coated and is patternwise exposed and developed by a conventional method to generate an opening 54 bisected by the center plane (not shown) and extending from plane 30-30 to a height c thereby exposing a portion of LS2 layer top surface 11h. Opening 54 corresponds to the desired shape and dimensions of the notch that is subsequently formed in the LS2 layer. An extension of opening 54 shown as opening 54a may be formed on the opposite side of plane 30-30 with respect to the eventual notch location.

Figure 14:
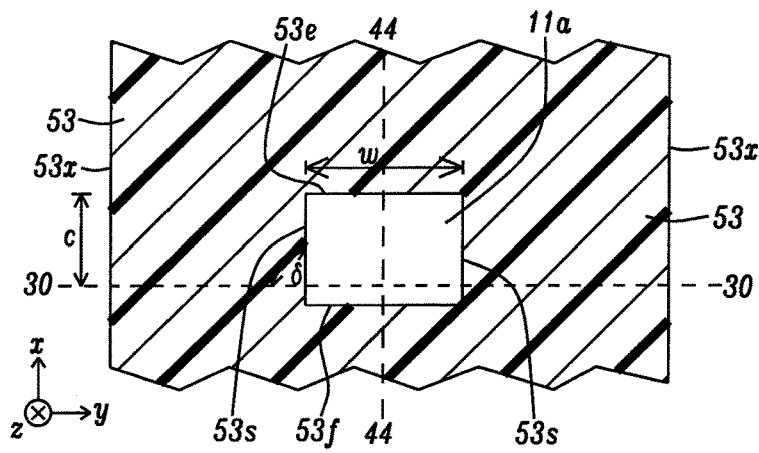
FIG. 14 and FIG. 16 are top-down views depicting a series of steps that are used to fabricate a patterned leading shield according to an embodiment of the present disclosure.

Referring to FIG. 14, a top-down view of photoresist layer 53 in FIG. 13 is shown. Sides 53s are equidistant from center plane 44-44 and determine width w at plane 30-30. Height c is from the front side 53f of the opening to backside 53e. In the exemplary embodiment, angle δ is 90 degrees, but may range from 10 degrees to 170 degrees in alternative embodiments as mentioned previously. Sides 53x of the photoresist layer overlay on LS2 layer far sides 11x (not shown).

Figure 15:
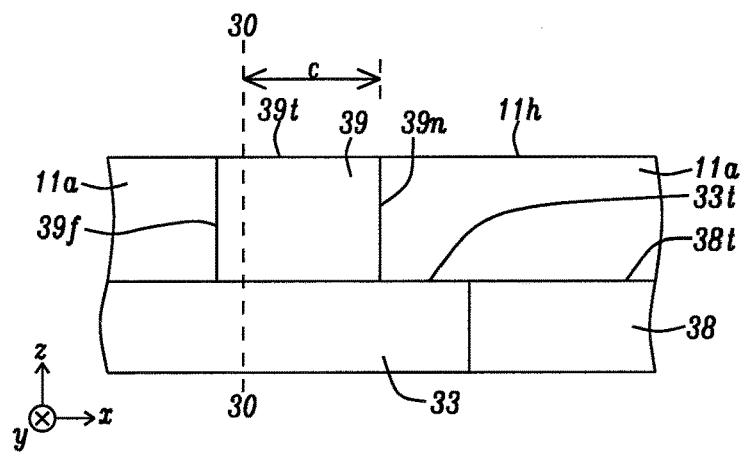

FIG. 15 shows the leading shield structure after an ion beam etch (IBE) or reactive ion etch (RIE) removes portions of LS2 layer 11a that are not protected by photoresist layer 53, and dielectric layer 39 is deposited to fill the opening (not shown) previously occupied by the LS2 layer that was removed by etching. The deposition may involve a chemical vapor deposition (CVD) or plasma enhanced CVD method, for example. Note that IBE or RIE may be employed to generate an angle β=90 degrees (not shown) while IBE may be used to form other β angles. A chemical mechanical polish (CMP) process may be used to remove the photoresist layer and excess dielectric material such that LS2 layer top surface 11h is coplanar with dielectric layer 39 top surface 39t. Thus, a notch comprised of dielectric layer 39 is formed between a front side 39f on one side of plane 30-30 and backside 39n on an opposite side of plane 30-30, and between top surface 39t and LSC top surface 33t. The dielectric material may be alumina, $SiO_2$, or the like.

Figure 16:
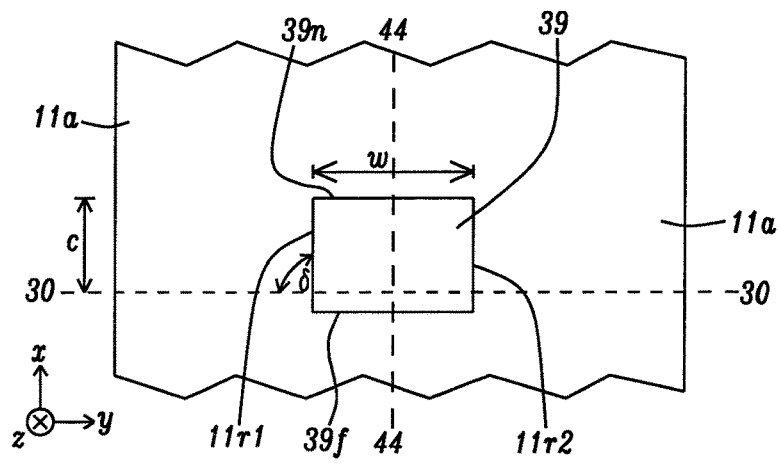

In FIG. 16, a top-down view of the partially formed leading shield structure in FIG. 15 is depicted. The notch front side 39f and back side 39n are formed below photoresist front side 53f and back side 53e, respectively, as a result of the aforementioned IBE or RIE. Also, notch sides 11r1 and 11r2 are formed below photoresist sides 53s during the etch process.

Figure 17:
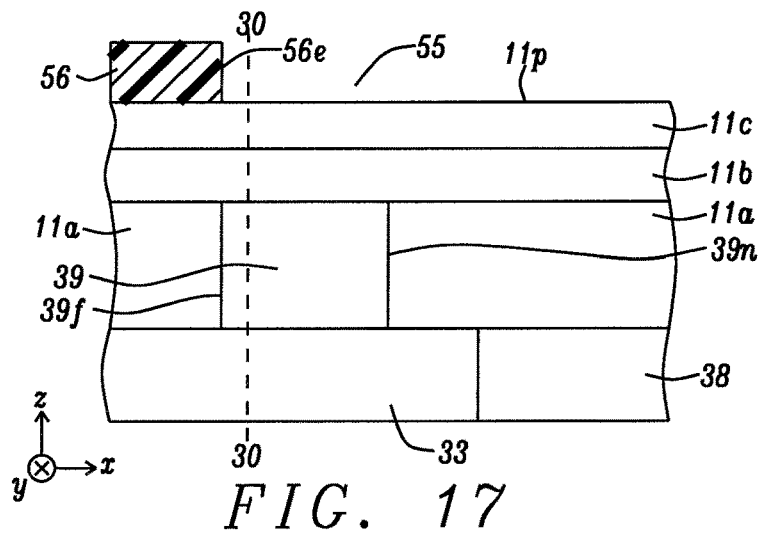

Thereafter, in FIG. 17, the partially formed patterned leading shield structure is illustrated after the LS1 layer 11b and LET layer 11c are sequentially deposited with a radio frequency (RF) sputter deposition, for example, on the LS2 layer 11a and the notch comprised of dielectric layer 39. A second photoresist layer 56 is patternwise exposed and developed to form an opening 55 that uncovers LET top surface 11p on a first side of plane 30-30 above dielectric layers 38, 39. The opening may extend to a side 56e of photoresist layer formed on an opposite side of plane 30-30 with respect to the first side.

Figure 18:
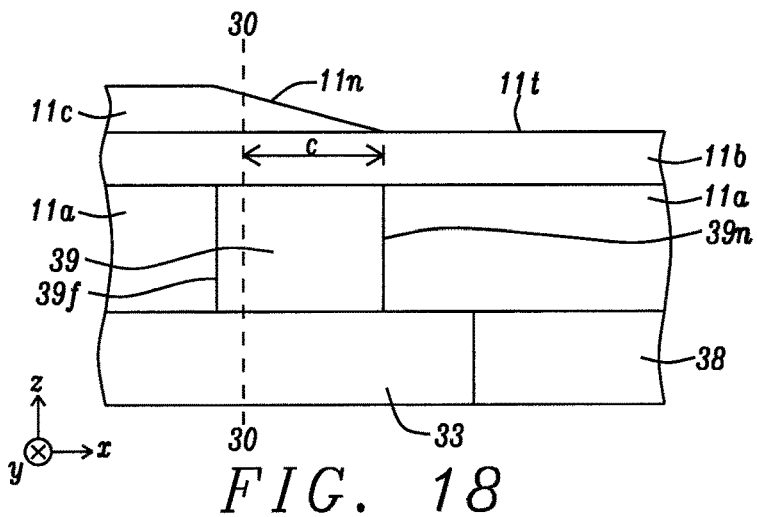

Referring to FIG. 18, the partially formed leading shield structure in FIG. 17 is illustrated after an angled IBE (not shown) is used to form LET tapered top surface 11n and expose a portion of LS1 top surface 11t in regions greater than height c from plane 30-30. In other words, LET tapered top surface 11n preferably intersects LS1 top surface at height c. The second photoresist 56 is removed after the angled IBE process.

Figure 19:
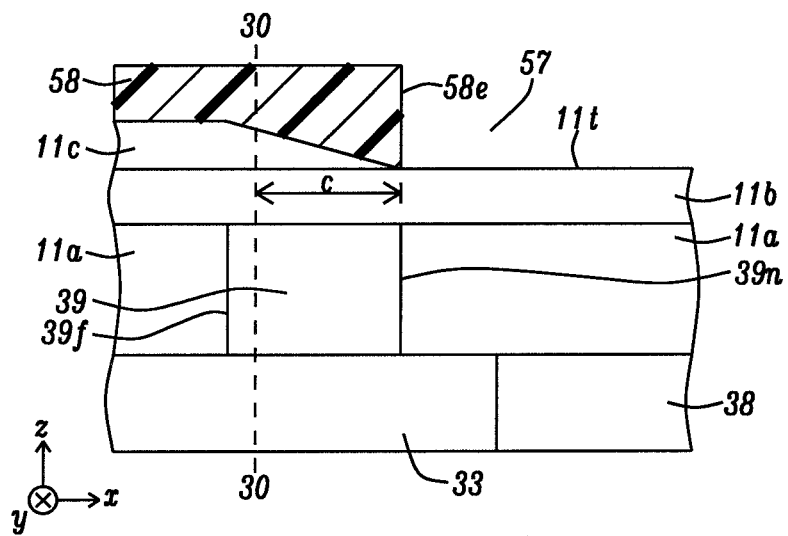

In FIG. 19, a third photoresist 58 is coated on LET layer 11c and LS1 top surface 1t. The third photoresist is patternwise exposed and developed to form a backside 58e thereon at height c from plane 30-30, and opening 57 thereby exposing LS1 top surface 1t.

Figure 20:
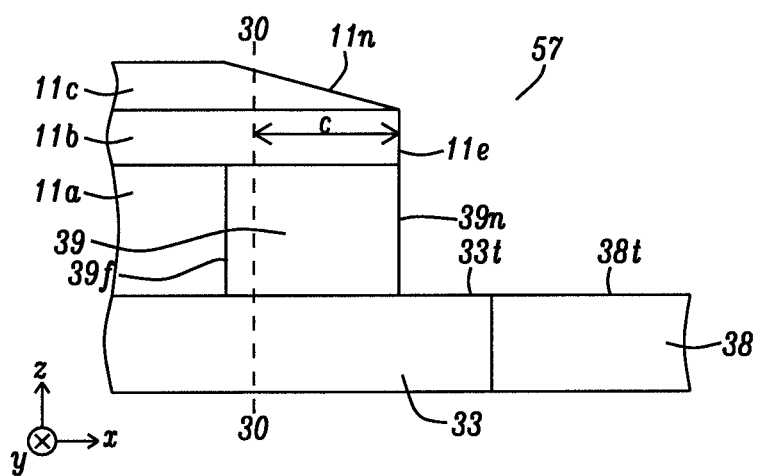

Referring to FIG. 20, the partially formed leading shield structure is depicted at center plane 44-44 after an etch process is used to transfer the opening 57 through exposed portions of LS1 layer 11b and LS2 layer 11a, and stopping at LSC top surface 33t and dielectric layer top surface 38t. As a result, LS1 backside 11e is formed coplanar with notch backside 39n. It should be understood that a down-track cross-sectional view (not shown) taken at cross-track positions greater than those of notch sides 11r1, 11r2 from the center plane will show both of the LS1 and LS2 layers having a backside 11e at height c.

Figure 21:
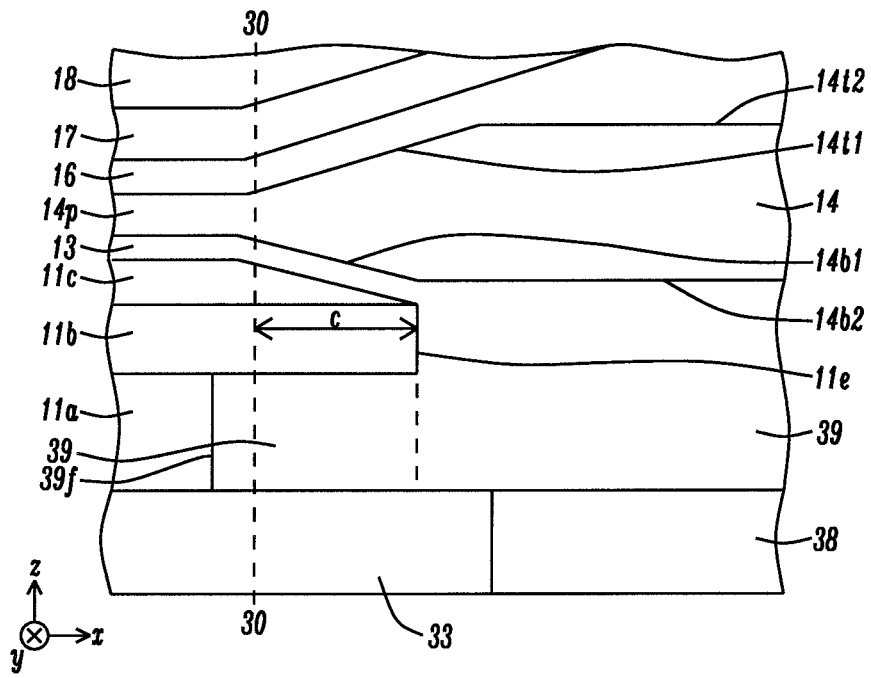

FIG. 21 depicts the PMR writer structure after dielectric layer 39 is deposited on LSC 33 and dielectric layer 38 to fill opening 57, and overlying PMR writer layers including leading gap 13, MP 14, write gap 16, first TS 17, and second TS 18 are sequentially formed on LET layer 11c and dielectric layer 39 using a conventional process flow.

Figure 22:
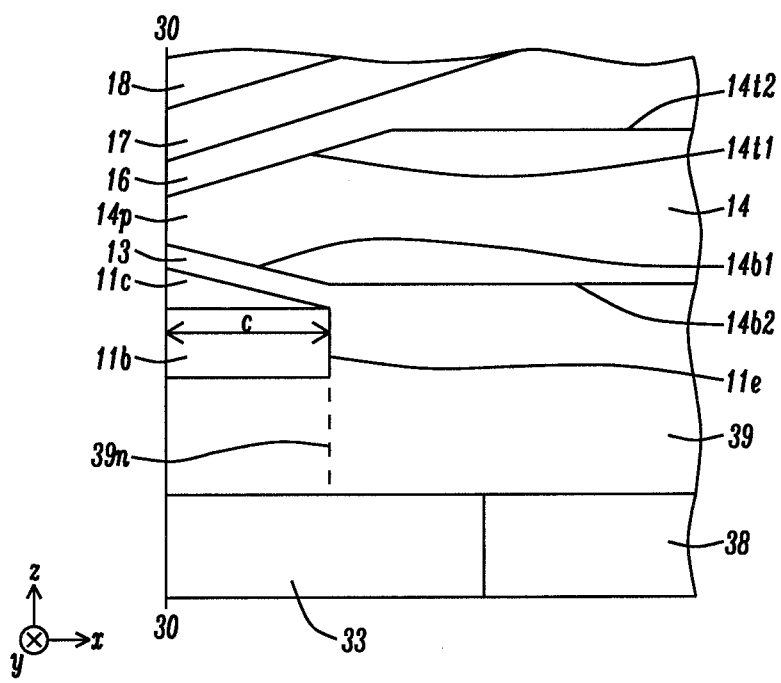

Referring to FIG. 22, after all layers in the PMR writer structure are formed, a lapping process is performed to generate ABS 30-30 comprised of a front side 11f of the leading shield according to an embodiment of the present disclosure.

While the present disclosure has been particularly shown and described with reference to, the preferred embodiment thereof, it will be understood by those skilled in the art that various changes in form and details may be made without departing from the spirit and scope of this disclosure.

We claim:

1. A perpendicular magnetic recording (PMR) writer; comprising:
   (a) a main pole with a first leading side and a trailing side that are bisected by a center plane, and two sides that connect the first leading side with the trailing side, the first leading side adjoins a lead gap having a front side at an air bearing surface (ABS), and the trailing side has a track width at the ABS;
   (b) the leading gap that separates the first leading side and a leading shield; and
   (c) the leading shield; comprising:
      (1) a LS2 layer comprised of a high damping (HD) material with a damping parameter≥0.04 and having a first cross-track width (v), a down-track thickness (t2), and a backside at a first height (c) from a front side thereof at the ABS, and comprised of a notch filled with a dielectric layer that extends from the ABS to a notch backside that is at a height>0 nm but ≤c from the ABS, and having a second cross-track width (w) at the ABS, where w<v, and wherein the notch is bisected by the center plane and has two front sides extending in a down-track direction at the ABS wherein each front side is formed at an angle β with a bottom surface of a LS1 layer;
      (2) the LS1 layer comprised of the HD material with the damping parameter≥0.04 that adjoins a top surface of the LS2 layer, and has the first cross-track width, a down-track thickness t1, and a backside at the first height from a front side thereof at the ABS; and
      (3) a leading edge taper (LET) layer made of the HD material with the damping parameter≥0.04 that adjoins the leading gap and is formed on a top surface of the LS1 layer, and having a front side at the ABS, and a tapered top surface that extends from the ABS to the LS1 layer top surface at the first height.

2. The PMR writer of claim 1 wherein the notch has an inner side that extends from the ABS to the LS2 layer backside on each side of the center plane, and wherein each notch inner side forms an angle δ from 10 degrees to 170 degrees with the ABS.

3. The PMR writer of claim 1 wherein each of the LET, LS1, and LS2 layers is made of a material with a magnetization saturation (Ms) from 1 kiloGauss (kG) to 19 kG.

4. The PMR writer of claim 1 wherein the second cross-track width is from about 200 nm to 14 microns.

5. The PMR writer of claim 1 wherein the first height is from about 50 nm to 1 micron.

6. The PMR writer of claim 1 wherein angle β is from 10 degrees to 170 degrees.

7. The PMR writer of claim 1 wherein t1 is from 50 nm to 700 nm, and t2 is from 300 nm to 950 nm.

8. The PMR writer of claim 1 further comprised of a side shield on each side of the center plane wherein each side shield is adjacent to a MP side, and a trailing shield that contacts a top surface of the side shield on each side of the center plane and formed above the main pole trailing side to provide an all wrap around (AWA) shield structure surrounding the main pole.

9. The PMR writer of claim 1 wherein the LET, LS1, and LS2 layers are comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 3 to 15 atomic % in the alloy.

10. A head gimbal assembly (HGA), comprising:
    (a) the PMR writer of claim 1; and
    (b) a suspension that elastically supports the PMR writer, wherein the suspension has a flexure to which the PMR writer is joined, a load beam with one end connected to the flexure, and a base plate connected to the other end of the load beam.

11. A magnetic recording apparatus, comprising:
    (a) the HGA of claim 10;
    (b) a magnetic recording medium positioned opposite to a slider on which the PMR writer is formed;
    (c) a spindle motor that rotates and drives the magnetic recording medium; and
    (d) a device that supports the slider, and that positions the slider relative to the magnetic recording medium.

12. A perpendicular magnetic recording (PMR) writer, comprising:
    (a) a main pole with a first leading side and a trailing side that are bisected by a center plane, and two sides that connect the first leading side with the trailing side, the first leading side adjoins a lead gap having a front side at an air bearing surface (ABS), and the trailing side has a track width at the ABS;
    (b) the leading gap that separates the first leading side and a leading shield; and
    (c) the leading shield; comprising:
       (1) a LS1 layer comprised of a high damping (HD) material with a damping parameter≥0.04 and having a first cross-track width (v), a down-track thickness (t1), and a backside at a first height (c) from a front side thereof at the ABS; and
       (2) a leading edge taper (LET) layer comprised of the HD material with a damping parameter≥0.04 that adjoins the leading gap and is formed on a top surface of the LS1 layer, and having a front side at the ABS, and a tapered top surface that extends from the ABS to the LS1 layer top surface at the first height, and wherein the leading shield is separated by a dielectric gap from other magnetic components in a leading loop for magnetic flux return to the main pole.

13. The PMR writer of claim 12 wherein the dielectric gap has a thickness from 300 nm to 950 nm.

14. The PMR writer of claim 12 wherein the LET and LS1 layers are made of a material with a magnetization saturation (Ms) from 1 kiloGauss (kG) to 19 kG.

15. The PMR writer of claim 12 wherein the first cross-track width is a full width of the leading shield between two far sides thereof.

16. The PMR writer of claim 12 wherein the first height is from about 50 nm to 1 micron.

17. The PMR writer of claim 12 wherein t1 is from 50 nm to 700 nm, and the LET layer has a thickness from 2 nm to 500 nm at the ABS.

18. The PMR writer of claim 12 further comprised of a side shield on each side of the center plane, and a trailing shield that contacts a top surface of the side shield on each side of the center plane and formed above the main pole trailing side to provide an all wrap around (AWA) shield structure surrounding the main pole.

19. The PMR writer of claim 12 wherein the LET and LS1 layers are comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 3 to 15 atomic % in the alloy.

20. A head gimbal assembly (HGA), comprising:
(a) the PMR writer of claim 12; and
(b) a suspension that elastically supports the PMR writer, wherein the suspension has a flexure to which the PMR writer is joined, a load beam with one end connected to the flexure, and a base plate connected to the other end of the load beam.

21. A magnetic recording apparatus, comprising:
(a) the HGA of claim 20;
(b) a magnetic recording medium positioned opposite to a slider on which the PMR writer is formed;
(c) a spindle motor that rotates and drives the magnetic recording medium; and
(d) a device that supports the slider, and that positions the slider relative to the magnetic recording medium.

22. A method of forming a patterned leading shield structure in a perpendicular magnetic recording (PMR) writer, comprising:
(a) providing a leading shield (LS2) layer on a substrate wherein the LS2 layer is made of a high damping (HD) material with a damping parameter≥0.04, has a down-track thickness (t2), and is intersected by a first plane that is orthogonal to a LS2 layer top surface;
(b) forming a notch that is filled with a dielectric layer on both sides of the first plane wherein the notch extends in a first direction from the first plane to a backside at a first height (c) from the first plane, and has a first cross-track width (w) at the first plane and two inner sides that are formed equidistant in a cross-track direction from a center plane that is orthogonal to the first plane, and two front sides that extend from a top surface to a bottom surface of the LS2 layer, the notch top surface is coplanar with the LS2 layer top surface;
(c) sequentially depositing a LS1 layer with a down-track thickness (t1) and made of the HD material, and a LET layer made of the HD material on the LS2 layer top surface;
(d) forming a tapered top surface on the LET layer that extends in the first direction from a first end at the first plane to a second end at the first height on the first side of the first plane;
(e) forming a backside on the LS1 layer and on the LS2 layer that is at the first height on the first side of the first plane, the backside extends from the top surface of the LS1 layer to a top surface of the substrate; and
(f) performing a lapping process to form an air bearing surface at the first plane thereby forming the patterned leading shield structure consisting of the LS2 layer with the notch on the first side of the first plane, and the LS1 and LET layers formed thereon.

23. The method of claim 22 wherein each of the LET, LS1, and LS2 layers is made of a material having a magnetization saturation (Ms) from 1 kiloGauss (kG) to 19 kG.

24. The method of claim 22 wherein each of the two notch sides forms an angle δ from 10 degrees to 170 degrees with the first plane.

25. The method of claim 22 wherein the first height is about 50 nm to 1 micron.

26. The method of claim 22 wherein each of the two notch front sides forms an angle β from 10 degrees to 170 degrees with a bottom surface of the LS1 layer.

27. The method of claim 22 wherein t1 is from 50 nm to 700 nm, and t2 is from 300 nm to 950 nm.

28. The method of claim 22 wherein the LET, LS1, and LS2 layers are comprised of an alloy that is one of FeNiM, FeCoM, and FeCoNiM where M is one of Re, Os, Ir, Rh, Ti, Ta, V, Cr, W, Mn, Mo, Cu, Zr, Nb, Hf, Ru, Pd, Pt, Ag, and Au, and the M content is about 3 to 15 atomic % in the alloy.

29. The method of claim 22 further comprised of depositing a dielectric layer that adjoins the backside of the LS1 and LS2 layers, and then sequentially forming a leading gap on the LET tapered top surface and a main pole layer on the leading gap before performing the lapping process.

* * * * *